UNITED STATES PATENT OFFICE.

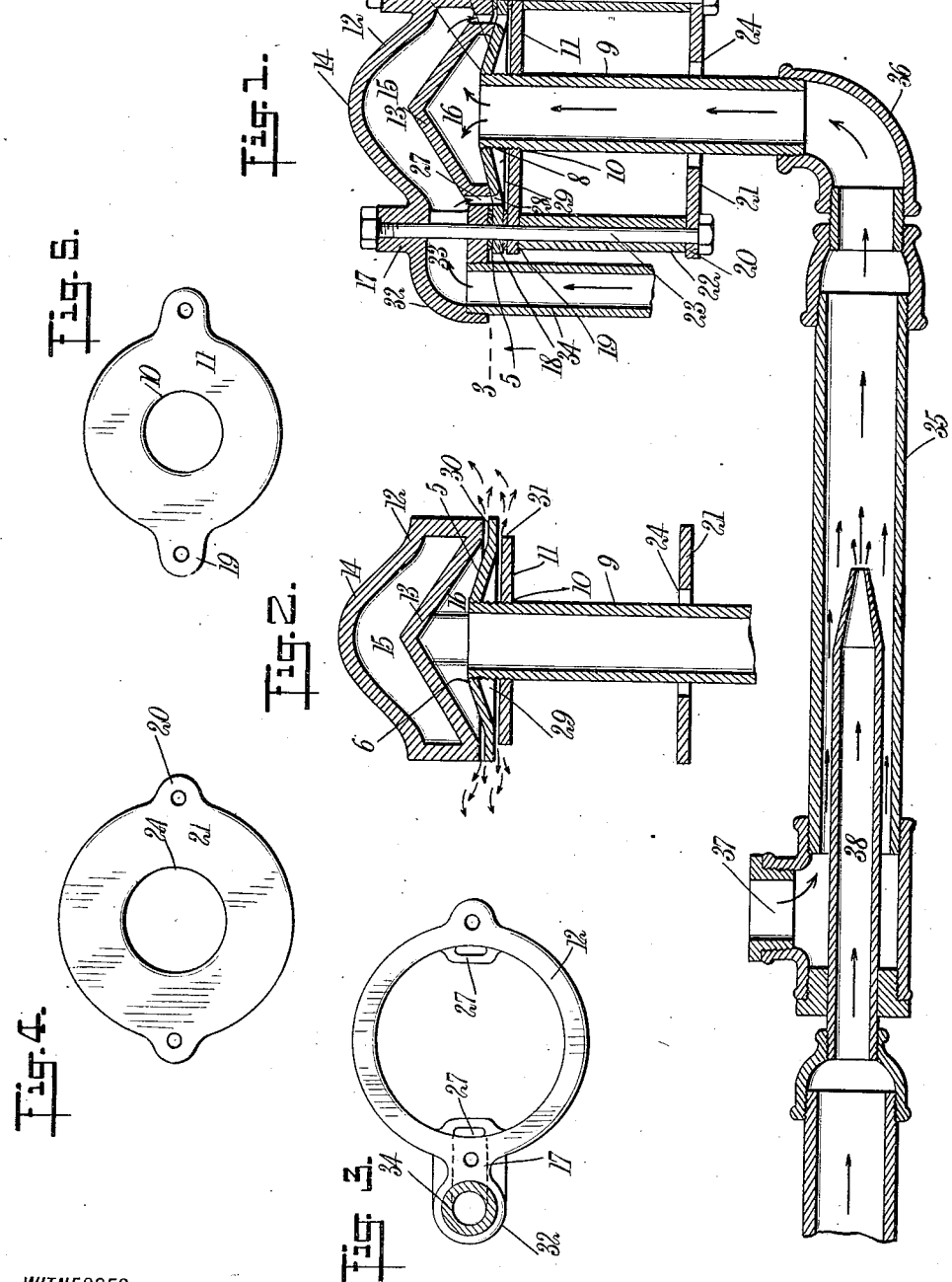

GEORGE ALFRED ULRICH, OF MEXICO, MEXICO.

OIL-BURNER.

1,095,753.  Specification of Letters Patent.  Patented May 5, 1914.

Application filed February 15, 1912, Serial No. 677,767. Renewed March 27, 1914. Serial No. 827,771.

*To all whom it may concern:*

Be it known that I, GEORGE A. ULRICH, a citizen of the United States, and a resident of the city of Mexico, Mexico, have invented a new and Improved Oil-Burner, of which the following is a full, clear, and exact description.

My invention relates to oil burners, and it has for its object to provide one having a chamber for superheating steam before it comes in contact with the oil to raise the temperature of the oil as it leaves the burner. As my burner is constructed it has the superheating chamber disposed over the mixing chamber for the combustible mixture, and the steam from the superheating chamber is led to an outlet point below the outlet for the combustible mixture.

Additional objects of my invention will appear in the following complete specification, in which the preferred form of the invention is disclosed.

In the drawings similar characters of reference indicate corresponding parts in all the views, in which—

Figure 1 is a sectional elevation of my burner, taken through the bolts which hold the members of the burner together, the view showing the inlets for the combustible mixture, and also for the steam; Fig. 2 is a sectional elevation of the burner, taken at one side of the bolts, and showing the outlets for the combustible mixture and also for the steam; Fig. 3 is a sectional view on the line 3—3 of Fig. 1; Fig. 4 is a plan view showing the plate at the bottom of the burner; and Fig. 5 is a plan view showing the plate disposed below the mixing chamber.

By referring to the drawings it will be seen that an annular plate 5 is provided, which has a central threaded opening 6, the plate 5 being disposed downwardly and outwardly from the threaded opening 6, with the outer edge 7 of the plate disposed horizontally. In the threaded opening 6 in the plate 5 there meshes a thread 8 on a vertical pipe 9, this thread 8 also meshing in a threaded opening 10, in the annular plate 11. Disposed on the plate 5 there is a member 12 having a cone-shaped bottom 13, and a bell-shaped top 14, spaced from the conical bottom 13, a superheating chamber 15 being formed between the cone-shaped bottom 13 and the bell-shaped top 14, and a mixing chamber 16 being formed between the plate 5 and the cone-shaped bottom 13 of the member 12. There are vertically disposed openings 17 in the member 12, which are disposed in alinement with vertical openings 18 in the plate 5, vertically disposed openings 19 in the plate 11, and vertically disposed openings 20 in the plate 21, sleeves 22 being disposed between the plates 11 and 21, the bolts 23 being disposed through the openings 17, 18, 19 and 20, and also through the sleeves 22, these bolts 23 serving to hold the several members together. There is an opening 24 in the plate 21, through which the pipe 9 extends, the said pipe being spaced from the walls of the said openings 24. Washers 25 are disposed between the member 12 and the plate 5, and washers 26 are disposed between the plate 5 and the plate 11. There are vertical openings 27 in the member 12, which extend downwardly from the superheating chamber 15, and connect with the openings 28 in the plate 5 for affording communication between the superheating chamber 15 and the chamber 29, which is disposed below the mixing chamber 16.

As will be seen by referring to Fig. 2 of the drawings, there is an outlet 30 from the mixing chamber 16 this outlet 30 extending substantially around the mixing chamber. There is also an outlet 31 from the chamber 29, the said outlet 31 being disposed below the outlet 30, and extending substantially around the burner. It will be noticed that the periphery of the plate 11 at the sides of the openings 19 is cut away so that the plate 5 extends beyond the plate 11 except at points near the openings 19.

An elbow 32 is constructed integral with the member 12, this elbow 32 having a passage 33, which communicates with the interior of the superheating chamber 15. A pipe 34 extends upwardly, and is connected with the elbow 32, conveying the steam to the said superheating chamber 15. A pipe 35 is connected by an elbow 36 with the pipe 9, this pipe 35 having a lateral inlet 37 through which oil is conveyed to the pipe 35. In the pipe 35 there is a nozzle 38, for injecting air and steam into the pipe 35.

In using the burner steam and air are injected into the oil by the nozzle 38 to increase the temperature of the oil. The combustible mixture formed of the oil, together with the air and steam, is forced against the bottom of the member 12, which forms the top of the mixing chamber 16, which assists in mixing the air and steam with the oil. Steam is conveyed by the pipe 34 to the superheating chamber 15, and this superheated steam passes from the superheating chamber 15 through the openings 27 in the member 12, and through the openings 28 in the plate 5 to the chamber 29, which is disposed below the mixing chamber 16. The steam in the said chamber which has been superheated in the superheating chamber 15 is then ejected through the annular outlet 31 below the combustible mixture which passes out of the mixing chamber 16, through the annular outlet 30. As the steam which is emitted from the annular outlet 31 has been superheated, it tends to raise the temperature of the combustible mixture, which is emitted, through the annular outlet 30. The opening 24 in the plate 21 at the bottom of the burner serves to furnish the burner with air, when the burner is in operation. The burner is constructed with annular outlets, so that it may be positioned in the center of the fire box, and it heats the fire box in a uniform manner, making the burner more practicable for the burning of crude oil than other burners hitherto known. As the fire box and flue sheets of the furnace are heated uniformly all around with the same expansion and contraction, it will be understood that when my burner is used it is not necessary to repair the fire box as frequently as is the case when burners of other types are made use of.

Having thus described my invention I claim as new and desire to secure by Letters Patent:

1. A burner having a compartment with a wall dividing the compartment into an upper super-heating chamber and a lower mixing chamber, the burner having an outlet for the mixing chamber, there being a passage from the superheating chamber with an outlet below the first-mentioned outlet.

2. An oil burner having a mixing chamber with an outlet substantially at its base, and a super-heating chamber disposed above the mixing chamber and provided with an outlet disposed below the first-mentioned outlet.

3. An oil burner having a mixing chamber with an outlet, a super-heating chamber disposed above the mixing chamber with an outlet disposed below and adjacent the first-mentioned outlet, so that fluids will flow independently through the outlets and from the chambers.

4. An oil burner having a compartment with a wall dividing the compartment into an upper superheating chamber and a lower mixing chamber, and independent outlets leading to the exterior of the chambers so that fluids will flow independently through the outlets and from the chambers.

5. A burner having a compartment with a wall dividing the compartment into an upper superheating chamber and a lower mixing chamber, the burner having a lateral outlet for the mixing chamber, there being a passage from the superheating chamber with an outlet below the first-mentioned outlet.

6. A burner having a mixing chamber with an outlet which extends substantially around the burner, and a superheating chamber disposed above the mixing chamber, with an outlet disposed below the first mentioned outlet and which extends substantially around the burner.

7. A burner having a mixing chamber with an inlet at the bottom of the chamber, and an outlet disposed substantially at the base of the chamber, the burner having a superheating chamber for steam, which is disposed above the mixing chamber and provided with an inlet and an outlet, the two outlets extending substantially around the burner.

8. A burner having a mixing chamber with an inlet at the bottom of the chamber, and an outlet, and a superheater for steam, which is disposed above the mixing chamber and provided with an inlet, and an outlet disposed below the first mentioned outlet, the two outlets extending substantially around the burner.

In testimony whereof I have signed my name to this specification in the presence of two subscribing witnesses.

GEORGE ALFRED ULRICH.

Witnesses:
FRED H. GUYANT,
N. ARCOS.

Copies of this patent may be obtained for five cents each, by addressing the "Commissioner of Patents, Washington, D. C."